(12) United States Patent
Timko et al.

(10) Patent No.: US 11,566,186 B2
(45) Date of Patent: Jan. 31, 2023

(54) WATER-ASSISTED ZEOLITE UPGRADING OF OILS

(71) Applicant: Worcester Polytechnic Institute, Worcester, MA (US)

(72) Inventors: Michael T. Timko, Arlington, MA (US); Geoffrey A. Tompsett, Shrewsbury, MA (US); Azadeh Zaker, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 17/055,014

(22) PCT Filed: May 15, 2019

(86) PCT No.: PCT/US2019/032351
§ 371 (c)(1),
(2) Date: Nov. 12, 2020

(87) PCT Pub. No.: WO2019/222307
PCT Pub. Date: Nov. 21, 2019

(65) Prior Publication Data
US 2021/0179950 A1    Jun. 17, 2021

Related U.S. Application Data

(60) Provisional application No. 62/671,695, filed on May 15, 2018.

(51) Int. Cl.
*C10G 45/26* (2006.01)
*C10G 45/12* (2006.01)
*B01J 29/40* (2006.01)

(52) U.S. Cl.
CPC .............. *C10G 45/12* (2013.01); *B01J 29/40* (2013.01); *C10G 45/26* (2013.01); *C10G 2300/4012* (2013.01)

(58) Field of Classification Search
CPC ........ C10G 45/12; C10G 45/26; C10G 45/30; C10G 2300/4012; B01J 29/40
See application file for complete search history.

(56) References Cited

U.S. PATENT DOCUMENTS 3,676,331 A * 7/1972 Pitchford ............... C10G 45/24
                                                        208/112
4,594,141 A * 6/1986 Paspek, Jr. ............ C10G 1/00
                                                        208/113
(Continued)

FOREIGN PATENT DOCUMENTS

CA         2883104 C     6/2017
WO    WO-2010064947 A1 *  6/2010 ............. C10G 47/32

OTHER PUBLICATIONS

International Search Report, PCT/US2019/032351, dated Aug. 29, 2019, pp. 2.
(Continued)

*Primary Examiner* — Michelle Stein
(74) *Attorney, Agent, or Firm* — Armis IP Law, LLC

(57) ABSTRACT

A petroleum refining method for upgrading petroleum products improves the efficiency and reduces the costs of upgrading oils, such as lipids, bitumen, crude oil, fracking oils, synthetic oils, and other feeds, to produce useful fuels and chemical precursor streams. Usage of a specific type of zeolite (ZSM-5) catalyst, supercritical water to control coke formation, and a specific response to phase behavior and other catalytic effects optimize the process. A prescribed set of reactor conditions employing supercritical water increases activity of the catalyst in industrial reactions.

8 Claims, 4 Drawing Sheets

(56) References Cited

U.S. PATENT DOCUMENTS

| | | | | |
|---|---|---|---|---|
| 4,818,370 A | * | 4/1989 | Gregoli | C10G 9/007 |
| | | | | 166/256 |
| 5,096,567 A | * | 3/1992 | Paspek, Jr. | C10G 9/00 |
| | | | | 208/106 |
| 2008/0071125 A1 | * | 3/2008 | Li | C10L 1/026 |
| | | | | 435/157 |
| 2008/0099378 A1 | | 5/2008 | He et al. | |
| 2009/0159498 A1 | * | 6/2009 | Chinn | C10G 31/08 |
| | | | | 208/85 |
| 2009/0159504 A1 | * | 6/2009 | Choi | B01J 3/008 |
| | | | | 208/249 |
| 2009/0178952 A1 | * | 7/2009 | Choi | C10G 47/32 |
| | | | | 208/27 |
| 2012/0101319 A1 | * | 4/2012 | Roberts | C10G 47/06 |
| | | | | 585/240 |
| 2013/0276361 A1 | * | 10/2013 | Maschmeyer | C10G 1/083 |
| | | | | 208/430 |
| 2014/0109465 A1 | * | 4/2014 | Coppola | B01J 3/008 |
| | | | | 44/307 |
| 2015/0284642 A1 | * | 10/2015 | Koseoglu | C10G 29/00 |
| | | | | 208/391 |
| 2017/0166824 A1 | | 6/2017 | Choi et al. | |
| 2018/0187093 A1 | * | 7/2018 | Choi | C10G 25/06 |
| 2018/0258353 A1 | * | 9/2018 | Choi | C10G 31/08 |

OTHER PUBLICATIONS

Zaker, et al., "Catalytic Cracking of Dodecane in Supercritical Water", No. 469755, IN: 2016 AIChE Annual Meeting, Nov. 14, 2016, pp. 2.

\* cited by examiner

| $k$ ($h^{-1}$) | SCD Model I | SCW/SCD Model I | Ratio of kinetic constants | |
|---|---|---|---|---|
| $k_1$ | 0.62 | 0.24 | 2.6 | 310-1 |
| $k_2$ | 0.16 | 0.14 | 1.1 | 310-2 |
| $k_3$ | 0.16 | 0.05 | 3.2 | 310-3 |
| $k_4$ | 0.43 | 0.005 | 86 | 310-4 |
| $k_5$ | 0.46 | negligible | NA | 310-5 |
| $k_6$ | NA | NA | NA | |
| | 312 | 314 | 316 | |

| $k$ ($h^{-1}$) | SCD Model I | SCW/SCD Model II | Ratio of kinetic constants |
| --- | --- | --- | --- |
| $k_1$ | 0.62 | 0.24 | 2.6 |
| $k_2$ | 0.16 | 0.14 | 1.1 |
| $k_3$ | 0.16 | 0.06 | 2.7 |
| $k_4$ | 0.43 | 0.003 | 143.3 |
| $k_5$ | 0.46 | negligible | NA |
| $k_6$ | NA | 0.15 | NA |

WATER-ASSISTED ZEOLITE UPGRADING OF OILS

RELATED APPLICATIONS

This application is a national stage filing of PCT application No.: PCT/US2019/032351 filed May 15, 2019 entitled "WATER-ASSISTED ZEOLITE UPGRADING OF OILS", which claims the benefit under 35 U.S.C. § 119(e) of U.S. Provisional Patent Application No. 62/671,695, filed May 15, 2018, entitled "WATER-ASSISTED ZEOLITE UPGRADING OF OILS," the entire teachings of which are incorporated herein by reference.

BACKGROUND

Continued demand for petroleum products ensures that technology for improving the refining process is sought. Catalysts are often added to petroleum refining reactors for improving speed, purity and/or yield in producing the resulting products, which typically include fuels and solvents. Zeolites are one such catalyst.

Zeolites are mineral compounds having particular microporous properties with beneficial uses as adsorbents and catalysts. ZSM-5 (Zeolite Socony Mobil-5) is an aluminosilicate zeolite composed of several pentasil units linked together by oxygen bridges to form pentasil chains. A pentasil unit consists of eight five-membered rings including the elements Al or Si and an O.

SUMMARY

A petroleum refining method for upgrading petroleum products improves the efficiency and reduces the costs of upgrading oils, such as lipids, bitumen, crude oil, fracking oils, synthetic oils, and other feeds, to produce useful fuels and chemical precursor streams. Usage of a specific type of zeolite (ZSM-5), supercritical water to control coke formation, and a specific response to phase behavior and other catalytic effects optimize the process. A novel set of reactor conditions increases activity of the catalyst in industrial reactions.

Configurations herein are based, in part, on the observation that refining operations for oils (hydrocarbon products) often employ catalysts to enhance the refining process. Refining allows products having different attributes, such as fuel and solvent properties, isomers and viscosity to be separated and extracted from a raw stock of oil. Unfortunately, conventional approaches to catalysts for refining suffer from the shortcomings that effectiveness of catalysts is slowed or stopped by coke accumulation, surface poisoning by sulfur and other elements, mechanical attrition, leaching and phase instability, along with others. Coke accumulation (coking) in particular, slows and inhibits catalyst response from carbon deposits settling on a surface of the reactants.

Accordingly, configurations herein substantially overcome the above-described shortcomings by providing a catalyst responsive to water in a supercritical phase for increasing cracking and reducing coking during the refining process. In the example configurations depicted below, a catalyst such as ZSM-5 (Zeolite Socony Mobil-5) combines with dodecane in the presence of supercritical water.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A method for operating a reactor for upgrading petroleum products is depicted below as a set of steps for execution of the refining process. Any suitable reactor may be employed for providing the temperature and pressure conditions expected by the process, and for adding the raw petroleum, catalysts and substances/compounds employed in the refining process.

Conventional approaches to coking reduction include a fluidized bed reactor, which strives to keep the reactants from settling by forcing reactants upwards to assume a fluidized state. The fluidized state effectively maintains the catalyst in a suspension against a natural settling from gravity such that particles are de-coked and return to the fluidized bed.

The fluidized bed approach encounters several problems. Catalysts are forced to move around the reactor, resulting in catalyst attrition as the catalyst breaks down. Production volume therefore requires a refreshed supply of catalyst to offset breakdown, requiring complex reactor construction to introduce fresh catalyst. A more subtle drawback is back mixing caused by a residence time of the catalyst in the reactor which tends to reduce the forward driving force of the reactions.

A packed bed reactor, in which the reactants are not forced against gravity, can mitigate some drawbacks but is not effective against coking. The packed bed reactor performs better against back mixing, but nonetheless results in a tradeoff between coking and complexity of the reactor system.

The approach disclosed and claimed herein mitigates the problem of coke formation while the reactor is operating in a static equilibrium, thus simplifying reactor construction and operation. In other words, the claimed approach facilitates cracking-refining larger hydrocarbon molecules into smaller ones, while mitigating coking-accumulating larger molecules (by carbon accumulations) that impede the catalyst operation.

Figure 1:
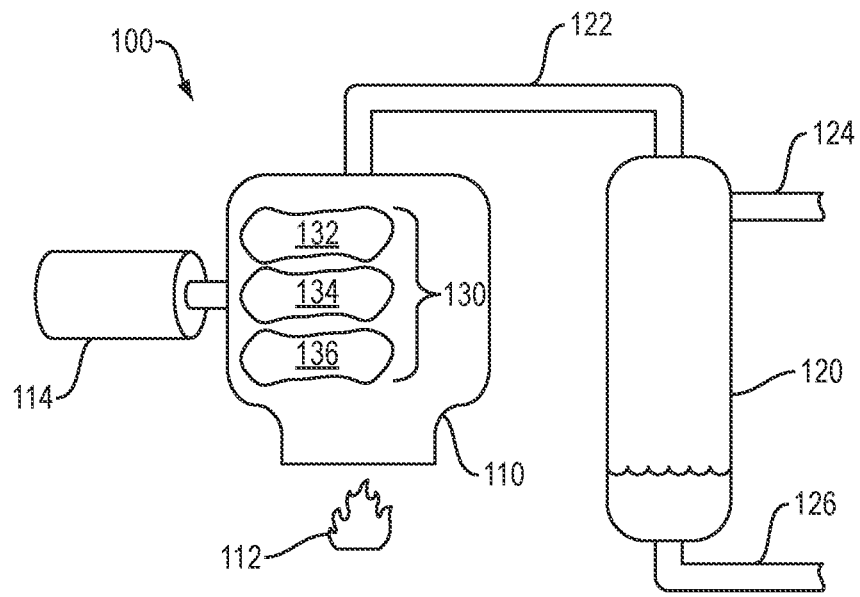
FIG. 1 is a context diagram of a simplified reactor arrangement.

FIG. 1 is a context diagram of a simplified reactor arrangement. Referring to FIG. 1, a reactor 100 typically includes a containment 110 for applying high heat and pressure to reactants, and a recovery vessel 120 such as a condenser or tank for receiving and extracting fluid products. A heat source 112 maintains temperature, and one or more pumps 114 may be employed for introducing reactants, maintaining pressure and providing other inputs for maintaining appropriate conditions in the containment 110. Multiple fluid vessels may also connect to the containment 110, including a connection 122 to the recovery vessel 120, a gaseous exit 124 and a liquid exit 126 for removing refined products or exhausted substances. The disclosed arrangement is an example and actual implementations may include various other vessels and/or containments for introducing, recycling and/or removing reacted materials.

In the example arrangement, the containment 110 receives reactants 130 including oil 132, which may be any suitable hydrocarbon for refining, and a catalyst 134. A selected quantity of water 136 ($H_2O$) is also added, and will be brought to a supercritical state by a reaction mixture composition, including a combination of temperature and pressure, as discussed further below.

Figure 2:
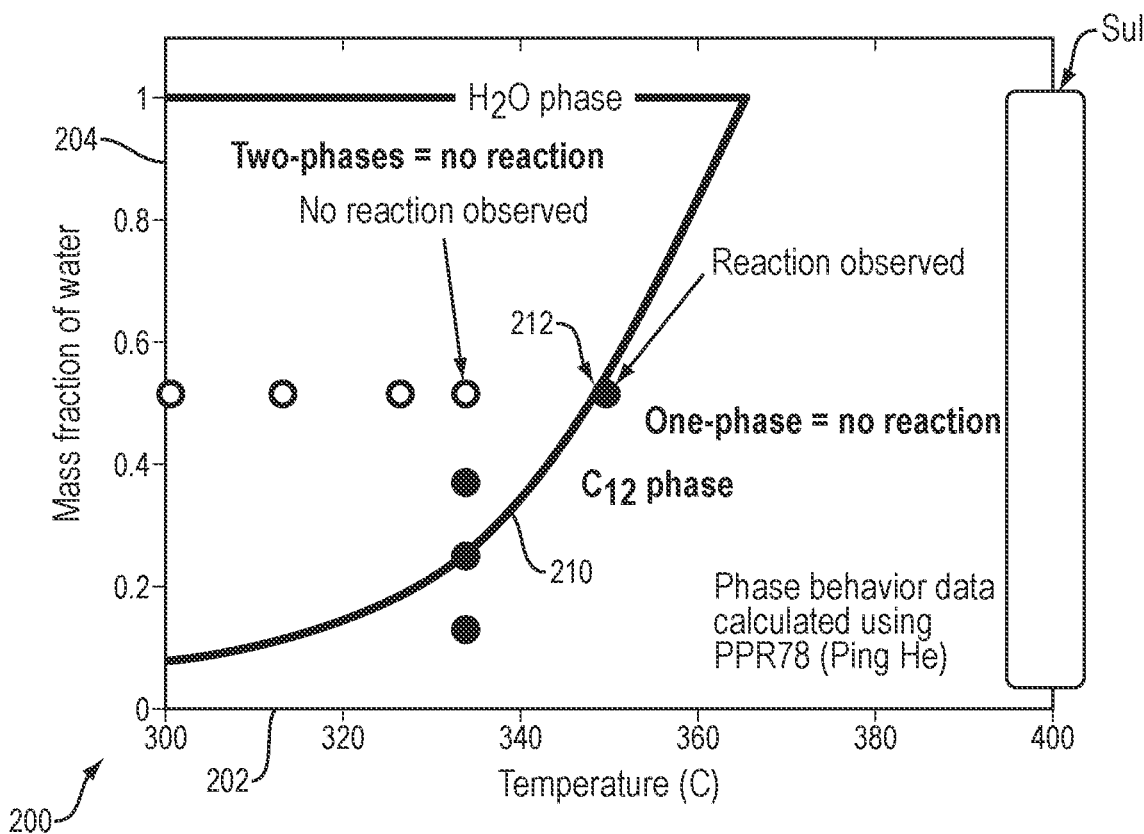
FIG. 2 is a phase diagram of supercritical water (SCW) in the reactor of FIG. 1.

FIG. 2 is a phase diagram of supercritical water (SCW) in the reactor 100 of FIG. 1. Referring to FIGS. 1 and 2, a temperate/pressure graph 200 of the water 136 depicts a horizontal axis 202 for temperature and a vertical axis 204 for the mass fraction of the water 136. Graph 210 depicts miscibility of the oil 132 and water 136, occurring when the water achieves a supercritical state 212. Temperature is expected to be around 375°-400° C., or may range between 350° and 425° C.

In a particular example, the oil 132 is dodecane ($CH_3(CH_2)10CH_3$, but may include other paraffins or olefin/alkene and various isomers. A catalyst 134 that has shown to be particularly favorable is ZSM-5 ($H^+{}_n(H_2O)_{16}|[Al_nSi_{96-n}O_{192}]$). In the example configuration, in the reactor 100 for refining fuels and solvents from petroleum products using a catalyst 134, the method of upgrading oils includes adding a quantity of oil 132 to the reactor containment 110, and adding a zeolite catalyst such as ZSM-5 to the reactor containment 110. A smaller quantity of water is also added to the reactor containment 110, such that the quantity of water is optimally less than 15% by weight of the quantity of oil. The containment 110 achieves miscibility of the oil 132 and water 136 by sealing the reactor containment 110 and increasing the temperature and pressure for attaining a supercritical state of the water such that the water and oil become miscible in the reactor, as shown in the graph 210 in FIG. 2. The containment 110 leads to the recovery vessel 120, which may include a condenser or similar structure that receives the refined products in either liquid or gaseous form. Depending on reactor construction, this may be a continuous process as the products of upgrading are pumped or extracted, or may be batch controlled with periodic separation and/or isolation of the high pressure contents via valves.

Operation of the reactor 110 continues at the supercritical temperature and pressure until cracking reactions are offset from coking reactions, such that cracking substantially exceeds coking, prolonging and optimizing the refining/upgrading of the oil 132. Depending on the reactor design, the reactor operation may continue in a cyclic manner, and typically involves condensing or draining fluid products from the zeolite upgrading/refining via the condenser 120. This is followed by extraction of a useable quantity of refined oil products resulting from reactor operation, typically via the gas product vessel 124 or the liquid product vessel 126.

Figure 3:
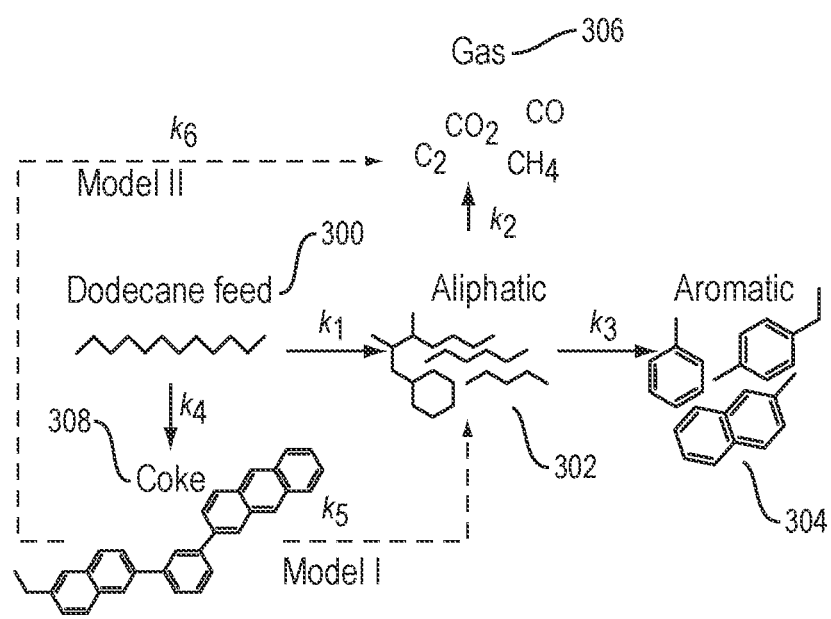
FIG. 3 shows results of the addition of SCW in the reactor of FIG. 1.

FIG. 3 shows results of the addition of SCW in the reactor of FIG. 1. Referring to FIGS. 2 and 3, products K1-K6 are shown as transitions from an initial reactor input of dodecane 300. The upgrading/refinement of the input oil (dodecane in the disclosed example) results in aliphatic 302 and aromatic 304 products. Aliphatic products 302 also transition to gaseous 306 products, while residual coke and heavy oils 308 remain and may further transition to additional aliphatic products 302. Rate constants for yield data for the respective transitions are shown in Rows 310-1 . . . 310-6, corresponding to the respective transitions K1 . . . K6. Constants for dodecane alone 312 and dodecane reacted with supercritical water (SCW) 314 are depicted, along with their respective ratios 316. SCW decreases most rate constants by a factor of 1.1-86. Only the aliphatic->gas constant (K2) is unaffected by the presence of water. This suggests a complicated role for water, in which initial dodecane cracking and subsequent aromatization are inhibited, whereas gas formation is not affected. FIG. 3 shows that the presence of SCW can affect the reaction through modification of the catalyst crystal structure or acid site density or by imposing a direct or indirect chemical or physical role in the containment 110. It should be noted that the disclosed model identifies unaffected gas yields and greatly reduced yields of other products, especially coke. The supported result is that the combination of temperature and pressure that causes the water to attain an upper critical solution temperature results in water selectively decreasing the rate of the undesirable coke formation reaction depending on concentration.

Figure 4:
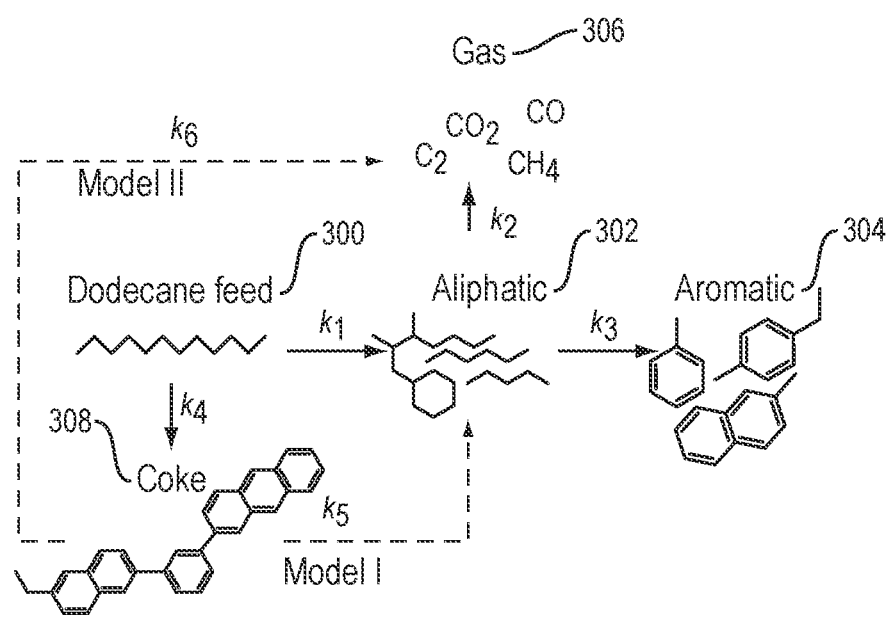
FIG. 4 shows an alternate configuration through modification of an aliphatic pathway of products from the reactor of FIG. 1.

FIG. 4 shows an alternate configuration through modification of an aliphatic pathway of products from the reactor of FIG. 1. Referring to FIGS. 3 and 4, FIG. 4 shows a configuration such that, instead of the Coke->Aliphatic pathway whose rate was negligible in the presence of SCW, a Coke->Gas pathway K6 is added for SCW/SCD (supercritical dodecane) cracking. Gasification values of pre-coked zeolite define and constrain the alternate K6 value. Constraint of the K4 value may also be applied to better predict the coke behavior in reactor operations using SCD/SCW.

The result is that the K1-K3 values remain substantially unchanged from FIG. 3, however the coke formation constant K4 is reduced even further compared to original model, attaining a ratio of 143 (col. 316). In general, the disclosed approach results in coking reduction by an order of 10 to 100 times.

Figure 5:
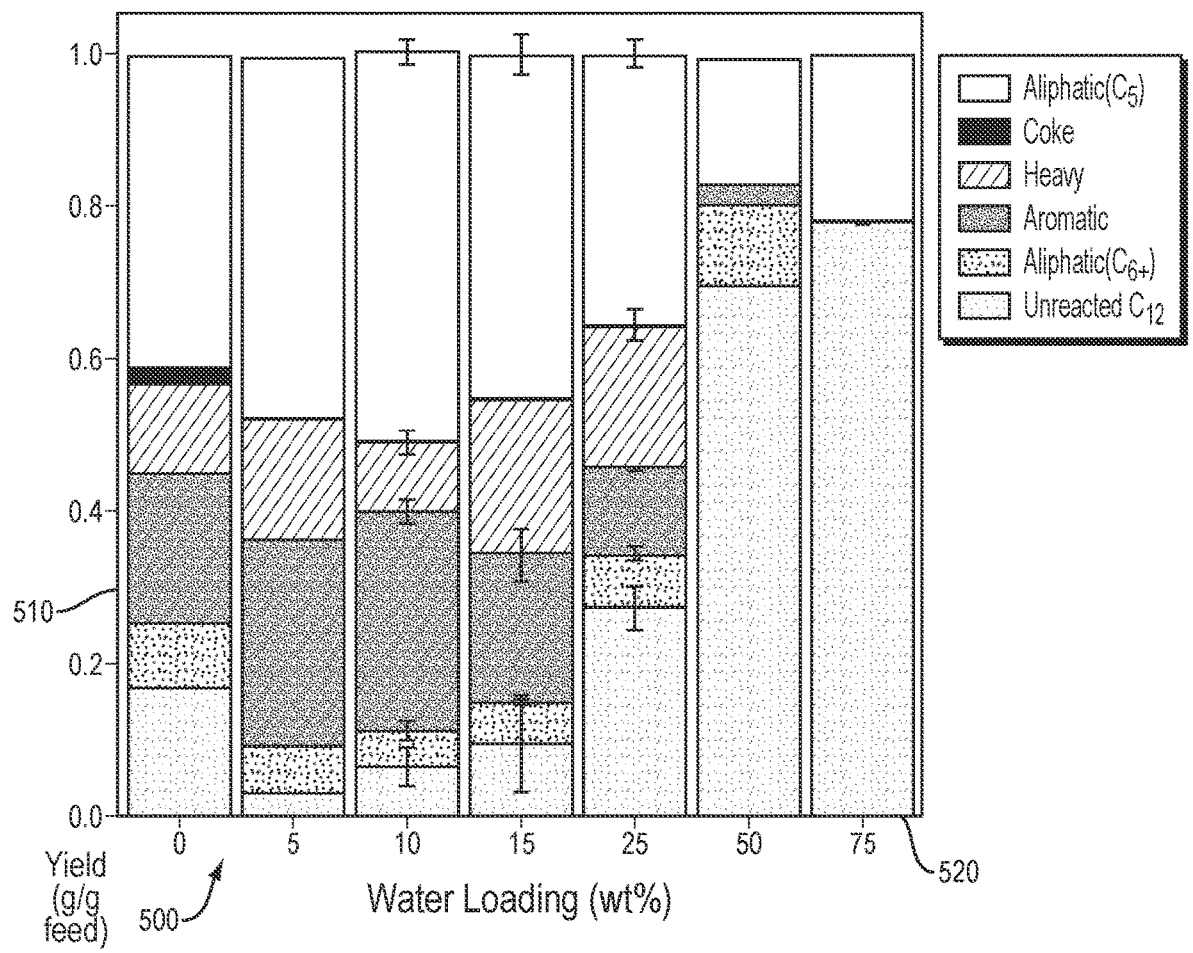
FIG. 5 shows product yields obtained from ZSM-5 catalyzed cracking of dodecane in the presence of 0-75 wt % SCW.

FIG. 5 shows product yields obtained from ZSM-5 catalyzed cracking of dodecane in the presence of 0-75 wt % SCW. Referring to FIG. 5, the conditions are as follows: 400° C., 24±2 MPa, 5 wt % catalyst loading relative to initial oil mass, 2 h reaction time, depicted in graph 500. To investigate the effect of water loading on ZSM-5 catalyzed dodecane cracking products, batch reactions were performed in the presence of 0-75 wt % SCW content, shown along horizontal axis 520. A vertical axis 510 provides the yields for major product categories (CO, CO2 and C1-C5 aliphatic, C6-C13 aliphatic, aromatic, heavier products and coke) for SCW/SCD cracking in the presence of 0-75 wt % SCW content. The result shows that water content plays a significant role in both dodecane conversion and product distribution. Dodecane conversion increases from 83% to >90% when the water content is varied from 0 wt % to 5-15 wt %. For water loading of 25 wt %, dodecane conversion decreases strongly to 73% and keeps decreasing with increasing the water loading. In terms of product distribution, as shown in FIG. 5, C1-C5 aliphatics are always the major products. However, for water loading <25 wt %, aromatic compounds are an important secondary product and their selectivity to aliphatic compounds is a strong decreasing function of water content for water loading >25 wt %. With water loading increasing >25 wt %, product selectivity increasingly favors C1-C5 aliphatics.

Figure 6:
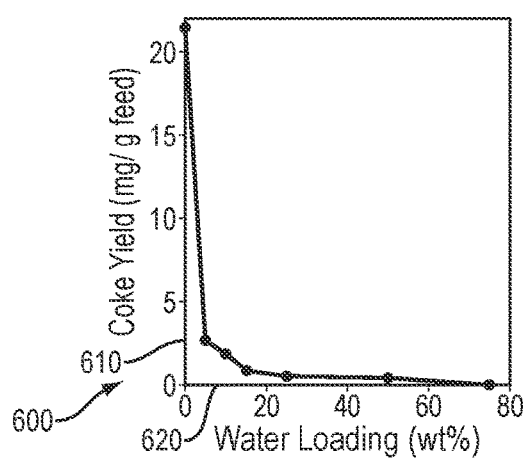
FIG. 6 shows coke yield obtained from ZSM-5 catalyzed cracking of dodecane in the presence of 0-75 wt % SCW.

FIG. 6 shows coke yield obtained from ZSM-5 catalyzed cracking of dodecane in the presence of 0-75 wt % SCW. Referring to the graph 600 in FIG. 6, conditions are as follows: 400° C., 24±2 MPa, 5 wt % catalyst loading relative to initial oil mass, 2 h reaction time, plotted for water loading % on the horizontal axis 620. The graph 600 shows that coke yield (vertical axis 510) is highly sensitive to water content that even modest amounts of water loading (i.e., <15 wt %) reduce coke yield by about an order of magnitude relative to that observed in the absence of water.

In another use case, feed composition (g/g feed) and product yields compare with aromatic composition of feed and products obtained from ZSM-5 catalyzed cracking in the presence of 0, 5 and 50 wt % SCW. The conditions were: 400° C., 24±2 MPa, 5 wt % catalyst loading relative to an initial oil mass, 2 h reaction time.

Atmospheric distillate was upgraded using ZSM-5 and 0, 5 and 50 wt % of SCW. The feed consists of 60% aliphatic, 5% aromatic and 35% heavy compounds. The results show formation of 20% aromatic compounds after a ZSM-5 catalyzed upgrading with 0% water. In addition, some of the heavy compounds and >C7 aliphatics cracked and formed <C7 aliphatic compounds. A comparison of the effect of and 50 wt % water on the distribution of the products was performed. Results show that addition of 50 wt % water does not form significant amount of aromatics and it is only cracking 10% of >C7 to <C7 aliphatic compounds. However, when the water content is decreased to 5 wt %, the result is ifs 27 wt % aromatic. In addition, this converts 17 wt % of the heavy compounds and 45 wt % of the >C7 aliphatics in the feed to <C7 aliphatics.

Increased toluene and xylene content of the product, less coke formation and less heavy compounds left unreacted, are the benefits of using 5 wt % water. Compared to a 0% water run, adding 5% water increases toluene and xylene formation by a factor of 1.9 and 2 respectively. The contents of other aromatic compounds stay constant for the two runs. In addition, comparing to 0% water, addition of 5% water decreases 70% of the coke and 33% of the heavy products.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a reactor for refining fuels and solvents from petroleum products using a catalyst, a method of upgrading oils comprising:
    adding a quantity of oil to the reactor;
    adding a zeolite catalyst to the reactor;
    adding a smaller quantity of water to the reactor, the quantity of water between 5-15% by weight of the quantity of oil thereby decreasing quantity of $C_{12}$ unreacted heavy compounds;
    sealing the reactor and increasing the temperature and pressure for attaining a supercritical state of the water such that the water and oil become miscible in the reactor;
    continuing operation of the reactor at the temperature and pressure until cracking reactions are offset from coking reactions; and
    extracting a useable quantity of refined oil products resulting from reactor operation.

2. The method of claim 1 wherein the catalyst is ZSM-5 ($H^+{}_n(H_2O)_{16}|[Al_nSi_{96-n}O_{192}]$).

3. The method of claim 1 wherein the combination of reaction mixture composition and pressure causes the water to attain an upper critical solution temperature.

4. The method of claim 1 further comprising recovering the refined oil by condensing.

5. The method of claim 1, wherein the refined oil further comprises at least one of: aliphatic products, and aromatic products.

6. The method of claim 1 further comprising removing from the reactor at least one residual product selected from: coke, and heavy oil.

7. The method of claim 6 further comprising extracting aliphatic and/or aromatic products from the residual product.

8. The method of claim 7, wherein the aromatic products comprise at least one of: toluene, and xylene.

* * * * *